United States Patent [19]
Knapp et al.

[11] Patent Number: 5,659,648
[45] Date of Patent: Aug. 19, 1997

[54] POLYIMIDE OPTICAL WAVEGUIDE HAVING ELECTRICAL CONDUCTIVITY

[75] Inventors: James H. Knapp, Chandler; Francis J. Carney, Gilbert, both of Ariz.

[73] Assignee: Motorola, Inc., Schaumburg, Ill.

[21] Appl. No.: 536,000

[22] Filed: Sep. 29, 1995

[51] Int. Cl.$^6$ ........................................ G02B 6/22
[52] U.S. Cl. ........................ 385/129; 385/132; 385/40
[58] Field of Search ............................. 385/2–3, 8–9, 385/40–44, 129–130, 132, 142

[56] References Cited

U.S. PATENT DOCUMENTS

| | | |
|---|---|---|
| 5,054,870 | 10/1991 | Losch et al. . |
| 5,058,970 | 10/1991 | Schildkraut et al. ................. 385/129 |
| 5,168,542 | 12/1992 | Chakravorty et al. ................. 385/132 |
| 5,218,663 | 6/1993 | Isono et al. . |
| 5,352,566 | 10/1994 | Springer et al. ....................... 385/132 |
| 5,369,722 | 11/1994 | Heming et al. . |
| 5,394,490 | 2/1995 | Kato et al. ............................. 385/129 |
| 5,540,346 | 7/1996 | Fujimoto et al. ..................... 216/24 |
| 5,598,501 | 1/1997 | Maruo et al. ......................... 385/143 |

FOREIGN PATENT DOCUMENTS

| | | |
|---|---|---|
| 9200538 | 1/1992 | European Pat. Off. . |
| 0178408 | 9/1985 | Japan ..................................... 385/129 |

OTHER PUBLICATIONS

Components, Hybrids & Manufacturing Technology Society IEEE; 45th Electronic Components & Technology Conference 1995; IEEE Catalog No. 95CH3582–0; Y.S. Liu et al., and J. Bristow et al., "Optoelectronic Packaging and Polymer Waveguides for Multichip Module and Board–Level Optical Interconnect Applications"; pp. 185–188.

*Primary Examiner*—John D. Lee
*Assistant Examiner*—Ellen Eunjoo Kang
*Attorney, Agent, or Firm*—George C. Chen

[57] ABSTRACT

A light transmitting structure or optical waveguide (47) of the present invention can provide both optical and electrical conductivity. The optical waveguide (47) is capable of simultaneously transmitting multiple optical and electrical signals. The optical waveguide (47) has several cladding layers (40, 41, 42, 43, 44) which optically isolate several different regions of waveguide core material (45, 46) through which the multiple optical signals are transmitted. To provide a compact structure, portions of the cladding layers (42, 43, 44) of the optical waveguide (47) are used as electrical conductors while the waveguide core material (45, 46) is used as an electrical insulator for the electrical conductors.

20 Claims, 2 Drawing Sheets

POLYIMIDE OPTICAL WAVEGUIDE HAVING ELECTRICAL CONDUCTIVITY

BACKGROUND OF THE INVENTION

This invention relates, in general, to an optical interconnect structure, and more particularly, to an optical waveguide which is also capable of conducting an electrical signal.

The speed at which data can be transferred from chip to chip, from board to chip, from board to board, and even from computer to computer can be limited by the speed of electron movement or transfer. One solution to this speed limitation is to convert the electronic transfer process to a photonic transfer process. Light emitting devices such as, for example, vertical cavity surface emitting lasers (VCSELs) can convert electrical signals to optical signals.

Light transmitting structures such as optical fibers are used to transmit or conduct the optical signal from one location to another. However, precise alignment is required for coupling the light transmitting structures to the light emitting devices. Moreover, electrical contacts carrying the original electrical signal must also be precisely aligned to the light emitting devices. Consequently, two different alignment procedures, which are difficult and expensive, must be successfully completed prior to obtaining a functional electro-optical system.

Accordingly, a need exists for an optical waveguide which is both manufacturable and inexpensive and which can also be used as an electrical interconnect structure to facilitate alignment to a light emitting device.

DETAILED DESCRIPTION OF THE DRAWINGS

A light transmitting structure or optical waveguide of the present invention can provide both optical and electrical conductivity. The optical waveguide is capable of simultaneously transmitting multiple optical and electrical signals. The optical waveguide has several cladding layers which optically isolate several different regions of waveguide core material through which the multiple optical signals are transmitted. To provide a compact structure, portions of the cladding layers of the optical waveguide are used as electrical conductors while the waveguide core material is used as an electrical insulator for the electrical conductors.

Figure 1:
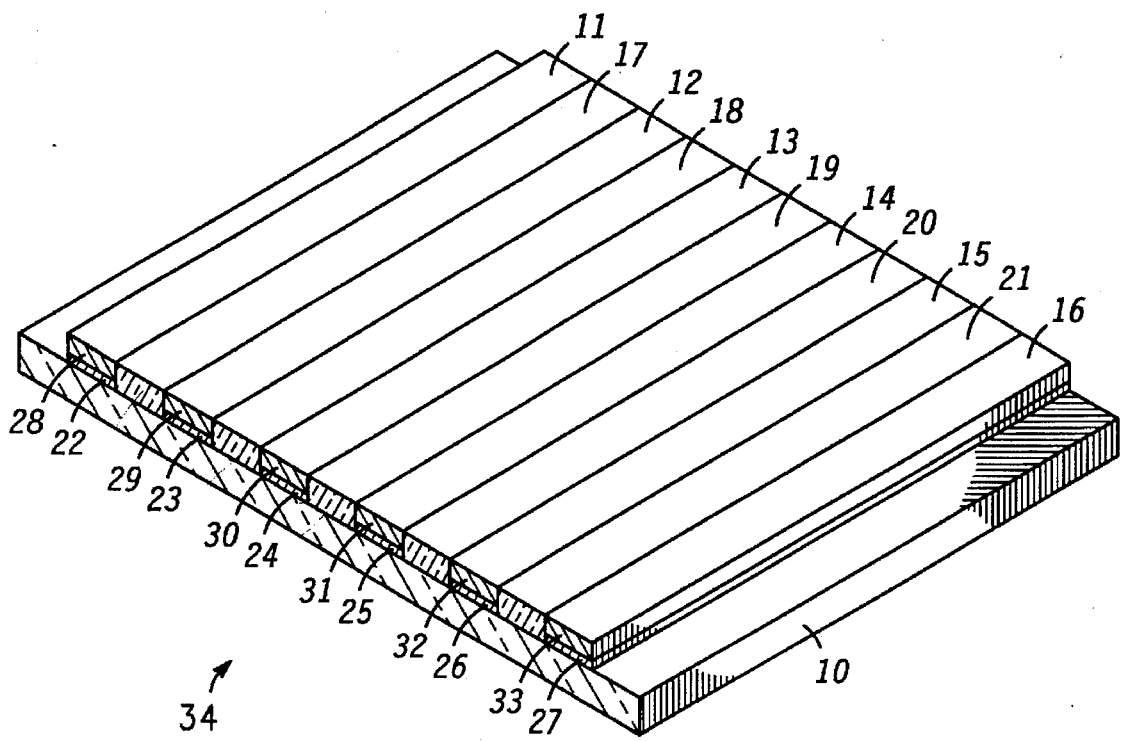
FIG. 1 illustrates a partial perspective cross-sectional view of an optical waveguide in accordance with the present invention.

Turning to the figures for a more detailed description, FIG. 1 illustrates a partial perspective cross-sectional view of an optical waveguide in accordance with the present invention. Polyimide optical waveguide 34 includes a polyimide layer 10 which serves as a substrate on which polyimide optical waveguide or optical waveguide 34 is built. Among other materials, polyimide layer 10 is preferably comprised of flexible polymer materials available under the trademark Kapton and manufactured by Dupont. Upilex™ can also be used for polyimide layer 10. Polyimide layer 10 is preferably about 25 to 200 microns thick. To facilitate the manufacturing of optical waveguide 34, polyimide layer 10 is most preferably Kapton™ which is conventionally used for tape automated bonding (TAB) tape. In fact, optical waveguide 34 can be manufactured using a process similar to that used for the production of TAB tape. However, polyimide layer 10 is not necessarily limited to the flexible polymer materials listed above. For instance, in an alternative embodiment, polyimide layer 10 can also be comprised of inflexible or rigid, materials such resin filled epoxy, polyester materials, fiber reinforced materials, or even semiconductors.

Also depicted in FIG. 1, optical waveguide 34 has waveguide core material 17, 18, 19, 20, and 21 which form waveguide channels through which optical signals are transmitted. Waveguide core material 17, 18, 19, 20, and 21 are laterally separated from each other by cladding layers or metal structures 11, 12, 13, 14, 15, and 16. Similarly, metal structures 11, 12, 13, 14, 15, and 16 are laterally separated from each other by waveguide core material 17, 18, 19, 20, and 21. For example, waveguide core material 17 and 18 are laterally separated by metal structure 12, and metal structures 11 and 12 are laterally separated by waveguide core material 17 and so on.

Waveguide core material 17, 18, 19, 20, and 21 can each conduct or transmit a separate light or optical signal. Polyimide layer 10 and metal structures 11, 12, 13, 14, 15, and 16 keep the transmitted optical signal within waveguide core material 17, 18, 19, 20, and 21 and provide optical isolation for each of the waveguide channels.

After formation of polyimide layer 10, metal structures 11, 12, 13, 14, 15, and 16, and waveguide core material 17, 18, 19, 20, and 21, an additional polyimide layer (not shown) is positioned over waveguide core material 17, 18, 19, 20, and 21 to serve as an upper cladding layer to keep the optical signal within waveguide core material 17, 18, 19, 20, and 21. At a minimum, optical waveguide 34 must have at least one waveguide core material 17 which is located by, contiguous to, positioned adjacent to, or between at least two metal structures 11 and 12.

Metal structures 11, 12, 13, 14, 15 and 16 can be fabricated using an inexpensive and manufacturable process similar to that used for producing metal leads or traces on TAB tape. For example, an adhesive can be used to affix a metallic sheet to polyimide layer 10, and a chemical or laser etching process can subsequently be used to define a desired configuration of metal structures 11, 12, 13, 14, 15, and 16.

However, a preferred method uses a plating technique. First, a metallic seed layer of gold or other appropriate seed material is sputtered over polyimide layer 10. Second, a photoresist layer is patterned over the metallic seed layer to define a desired configuration of metal structures 11, 12, 13, 14, 15, and 16. Third, the exposed portions of the metallic seed layer are plated to a desired height preferably using an electrolytic process to form plated metal layers 28, 29, 30, 31, 32, and 33. Next, the photoresist layer is removed using known processes, and the subsequently exposed portions of the metallic seed layer can then be etched away. The above described preferred method produces an inert reflective surface embodied as metal structures 11, 12, 13, 14, 15, and 16 which are comprised of plated metal layers 28, 29, 30, 31, 32, and 33, respectively, located over metallic seed layers 22, 23, 24, 25, 26, and 27, respectively. The height of metal structures 11, 12, 13, 14, 15, and 16 is dependent upon the heights of their respective metallic seed layers and plated metal layers. For instance, the height of metal structure 11 is the combined height of metallic seed layer 22 and plated metal layer 28, and the height of metal structure 12 is the combined height of metallic seed layer 23 and plated metal layer 29 and so on.

Waveguide core material 17, 18, 19, 20, and 21 is preferably an optically transparent or optically conductive adhesive which holds optical waveguide 34 together. For instance, waveguide core material 17, 18, 19, 20, and 21 can be a material available under the trademark EPO-TEK 353ND from Epoxy Technology, Inc. Waveguide core material or optically conductive adhesive 17, 18, 19, 20, and 21 can be dispensed or otherwise disposed onto polyimide layer 10 and into regions between or contiguous to metal structures 11, 12, 13, 14, 15, and 16 and then subsequently cured using techniques such as air drying, UV light exposure, or heat treating processes. In a preferred embodiment, the cross sectional area of a single waveguide channel through which an optical signal is conducted is approximately 45 to 250 microns$^2$. The spacing between and the height of metal structures 11, 12, 13, 14, 15, and 16 define the cross sectional area of the waveguide channels.

Assuming polymide layer 10 is a flexible substrate, metal structures 11, 12, 13, 14, 15, and 16 and waveguide core material 17, 18, 19, 20, and 21 are, preferably, also flexible such that optical waveguide 34 can be bent or positioned in a variety of configurations to facilitate its use and its coupling to an active semiconductor device such as an optical device, an opto-electronic device, or even a non-optical device. In this embodiment, optical waveguide 34 can be easily coupled to the active device using similar techniques as used for TAB tape.

Regardless of its composition, waveguide core material 17, 18, 19, 20, and 21 should have low optical transmission loss, low optical absorbtance, and a controllable refractive index. Moreover, polyimide layer 10 should also have a controllable refractive index as well. In particular, the index of refraction of polyimide layer 10 should be less than the index of refraction for waveguide core material 17, 18, 19, 20, and 21. In this manner, the optical signal traveling through waveguide core material 17, 18,19, 20, or 21 will be contain by or will remain within the waveguide core material. Preferably, the index of refraction for waveguide core material 17, 18, 19, 20, and 21 is at least 0.028 greater or larger than the index of refraction for polyimide layer 10.

Metal structures 11, 12, 13, 14, 15, and 16 also aid to keep the optical signal traveling within waveguide core material 17, 18,19, 20, and 21. However, instead of using a difference in the indices of refraction of two materials, metal structures 11, 12, 13, 14, 15, and 16 use its reflective properties to contain the optical signal within waveguide core material 17, 18, 19, 20, and 21. In other words, if the optical signal were to hit a metal structure, the metal structure would reflect the signal back into the waveguide core material.

While waveguide core material 17, 18, 19, 20, and 21 is optically conducting, it is also preferably electrically insulating. Furthermore, polyimide layer 10 is also preferably electrically insulating. As a result, metal structure 11 is electrically isolated from metal structure 12 by polyimide layer 10 and waveguide core material 17. Similarly, metal structure 12 is electrically isolated from metal structure 13 by polyimide layer 10 and waveguide core material 18 and so on. With the above described configuration, metal structures 11, 12, 13, 14, 15, and 16 are all electrically isolated from each other and can be used as an electrical interconnect structure.

Consequently, a more compact opto-electronic interconnect structure is embodied as optical waveguide 34 because the optically conducting portions also serve as the electrically insulating portions and the electrically conducting portions are also used as the optically insulating portions. Furthermore, if the electrical and optical conducting portions of optical waveguide 34 are configured in a mirror image of electrical and optical leads of an opto-electronic semiconductor device, only one alignment procedure is necessary to provide both optical and electrical coupling to the opto-electronic semiconductor device. Additionally, it is understood that the waveguide, channels of optical waveguide 34 do not have to be straight and parallel to each other as depicted in FIG. 1. Instead, the waveguide channels can be curved or any other desired configuration.

Figure 2:
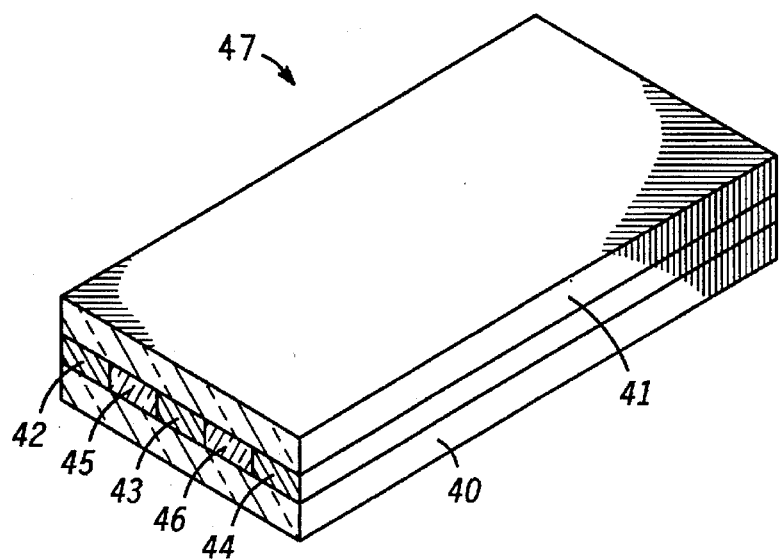
FIGS. 2 and 3 portray a partial perspective cross-sectional view of alternative embodiments of an optical waveguide.

Continuing with the next figure, FIG. 2 portrays a partial perspective cross-sectional view of an alternative embodiment of an optical waveguide in accordance with the present invention. Optical waveguide 47 has waveguide core material 45 and 46 though which an optical signal is conducted or transmitted, and optical waveguide 47 also has cladding layers 40, 41, 42, 43, and 44 which keep or contain the optical signal within the aforementioned waveguide core material. Cladding layers 40 and 41 can be similar in both function and composition to polyimide layer 10 of FIG. 1. Likewise, cladding layers 42, 43, and 44 of FIG. 2 can also be similar in both function and composition to metal structures 11, 12, 13, 14, 15, and 16 of FIG. 1. Additionally, waveguide core material 45 and 46 of FIG. 2 can be similar to waveguide core material 17, 18, 19, 20, and 21 of FIG. 1. Therefore, cladding layer 43 is electrically isolated from cladding layer 42 by waveguide core material 45 and cladding layers 40 and 41, and cladding layer 43 is also electrically isolated from cladding layer 44 by waveguide core material 46 and cladding layers 40 and 41.

However, in an alternative embodiment, cladding layers 42, 43, and 44 are strips or pieces of a similar material as cladding layers 40 and 41. In this alternative embodiment, cladding layers 40, 41, 42, 43, and 44 are all comprised of a flexible polymer material. Additionally, waveguide core material 45 and 46 can be strips or pieces of a different flexible polymer material which is optically conductive. Therefore, optical waveguide 47 can be several hundreds of meters long, can be dispensed from a spool in a manner similar to that of thread or wire, and can be cut into appropriate lengths. It is noted that regardless of their composition, waveguide core material 45 and 46 and cladding layers 40, 41, 42, 43, and 44 of optical waveguide 47 still need to comply with the index of refraction constraints previously described for FIG. 1 where the index of refraction for the waveguide core material is greater than the index of refraction for the cladding layers. For this alternative embodiment, it is understood that the indices of refraction for all of the surrounding cladding layers can be substantially identical.

Another preferred or desired characteristic of the components of optical waveguides 34 and 47 is high thermal stability. With high thermal stability, the optical waveguides will be able to withstand the electronic packaging and assembly processes used in semiconductor component manufacturing. Procedures such as die attach, metallization, solder reflow, and wire bonding are examples of high temperature processes to which the optical waveguides may be subjected and from which the optical waveguides should be able to survive.

Figure 3:
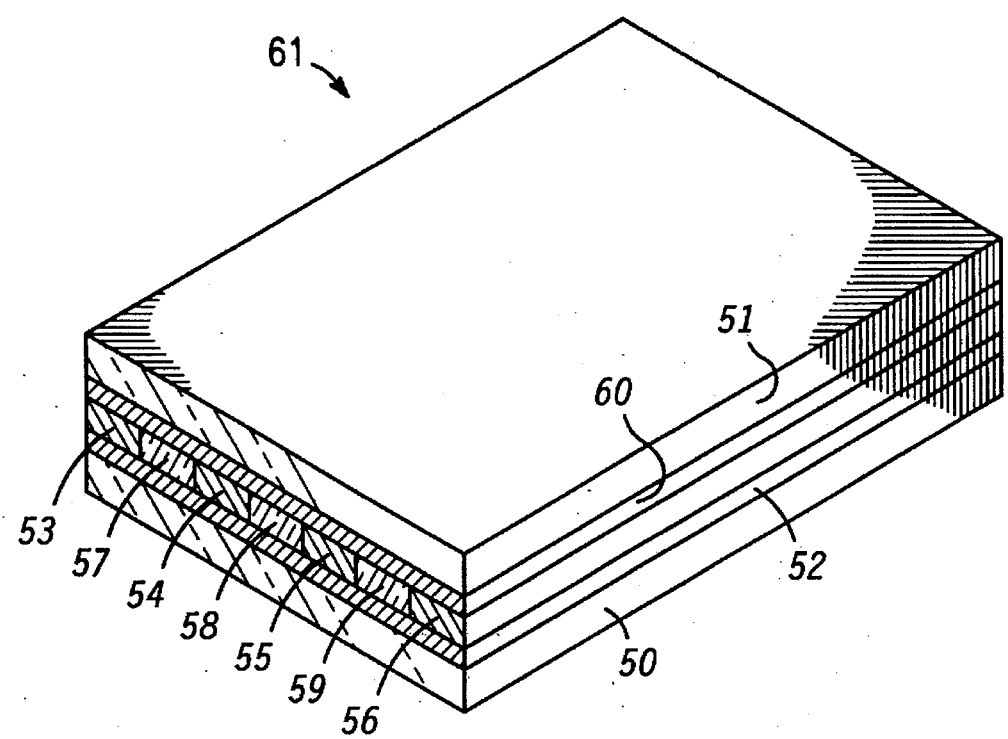

Referring to the next figure, FIG. 3 portrays a partial perspective cross-sectional view of yet another alternative embodiment of an optical waveguide in accordance with the subject invention. Waveguide 61 of FIG. 3 is similar to waveguide 34 of FIG. 1. In particular, waveguide 61 includes: polyimide layers 50 and 51 which are similar to polyimide layer 10, seed layers or conductivity layers 52 and 60 which are similar to metallic seed layers 22, 23, 24, 25, 26 and 27, plated metal layers 53, 54, 55, and 56 which are similar to plated metal layers 28, 29, 30, 31, 32, and waveguide core material 57, 58, and 59 which are similar to waveguide core material 17, 18, 19, 20, and 21. The different strips of waveguide core material 57, 58, and 59 are separated by at least a portion of the metallic structures of FIG. 3.

One difference in constructing waveguide 61 of FIG. 3 compared to waveguide 34 of FIG. 1 is that portions of conductivity layer 52 are not removed or etched away after plating plated metal layers 53, 54, 55, and 56. Therefore, conductivity layer 52 remains under waveguide core material 57, 58, and 59 for waveguide 61. A second difference is that conductivity layer 60 is sputtered onto plated metal layers 53, 54, 55, and 56 and waveguide core material 57, 58, and 59 to form an upper reflective surface. To complete waveguide 61, polyimide layer 51 is affixed to conductivity layer 60.

Because the waveguide core material is surrounded by a metallic surface on four sides, waveguide 61 of FIG. 3 uses the property of reflection to contain an optical signal within the waveguide channels. Waveguide 61 does not use a difference in the index of refraction of two materials to contain an optical signal. Therefore, waveguide 61 is used mainly for single mode transmission of light.

Therefore, in accordance with the present invention, it is apparent there has been provided an improved optical waveguide which overcomes the disadvantages of the prior art. The subject invention provides an optical waveguide which can also be used to simultaneously conduct optical and electronic signals. The present invention facilitates alignment to a semiconductor device, is cost efficient, and is easily manufacturable.

We claim:

1. A polyimide optical wavelength comprising:
   a first polyimide layer;
   at least two metal structures over the first polyimide layer;
   a waveguide core material over the first polyimide layer and between at least a portion of the at least two metal structures, the waveguide core material having a first index of refraction and comprising an optically conductive adhesive; and
   a second polyimide layer over the at least two metal structures.

2. The polyimide optical waveguide according to claim 1, wherein each of the at least two metal structures further comprise:
   a first metallic seed layer over the first polyimide layer; and
   a plated metal layer over the first metallic seed layer.

3. The polyimide optical waveguide according to claim 2, wherein the second polyimide layer is over the waveguide core material and further comprising a second metallic seed layer between the waveguide core material and the second polyimide layer, wherein the waveguide core material is over the first metallic seed layer and wherein the first metallic seed layer is between the waveguide core material and the first polyimide layer.

4. The polyimide optical waveguide according to claim 1, wherein the at least two metal structures are electrically conducting and wherein the waveguide core material is electrically insulating such that the polyimide optical waveguide is both optically and electrically conducting.

5. The polyimide optical waveguide according to claim 4, wherein the at least two metal structure are electrically isolated from each other by the waveguide core material and by the first and second polyimide layers.

6. The polyimide optical waveguide according to claim 1, wherein the first index of refraction is larger than indices of refraction of the first polyimide layer and the second polyimide layer.

7. The polyimide optical waveguide according to claim 6, layer and wherein the indices of refraction of the first and second polyimide layers are substantially identical.

8. The polyimide optical waveguide of claim 1 wherein the first polyimide layer is rigid.

9. The polyimide optical waveguide of claim 1 wherein the first polyimide layer is flexible.

10. An opto-electronic system comprising:
    a first cladding layer;
    a waveguide core material over the first cladding layer, wherein the waveguide core material is optically conductive;
    a second cladding layer contiguous to the waveguide core material and over the first cladding layer, wherein the second cladding layer is electrically conductive;
    a third cladding layer contiguous to the waveguide core material and over the first cladding layer, wherein the third cladding layer is electrically conductive; and
    a fourth cladding layer over the waveguide core material wherein the waveguide core material and the first, second, third, and fourth cladding layers are flexible.

11. The opto-electronic system according to claim 10, wherein the first and fourth cladding layers consist essentially of a flexible polymer material.

12. The opto-electronic system according to claim 10, wherein the second and third cladding layers are metallic.

13. The opto-electronic system according to claim 12, wherein the waveguide core material, the first cladding layer, and the fourth cladding layer electrically isolate the second and third cladding layers from each other.

14. The opto-electronic system according to claim 12, wherein the second and third cladding layers each further comprise:
    a plated metal layer; and
    a metallic seed layer between the plated metal layer and the first cladding layer.

15. The opto-electronic system according to claim 10, wherein the metallic seed layer is between the first cladding layer and the waveguide core material.

16. The opto-electronic system according to claim 10, wherein the first and fourth cladding layers have a first and second index of refraction, respectively, wherein the waveguide core material has a third index of refraction at least 0.028 greater than the first and second indices of refraction, and wherein the first and second indices of refraction are substantially identical.

17. The opto-electronic system according to claim 10, wherein the waveguide core material is an optically conductive adhesive.

18. A opto-electronic system comprising:
    a first polyimide layer;
    a second polyimide layer over the first polyimide layer;
    a plurality of metal structures between the first polyimide layer and the second polyimide layer, each of the plurality of metal structures spatially separated from each other, each of the plurality of metal structures comprising a plated metal layer over a first metallic seed layer; and an optically conductive adhesive between the first polyimide layer and the second polyimide layer and between at least a portion of the plurality of metal structures comprising a plated metal layer over a first metallic seed layer; and an optically conductive adhesive between the first polyimide layer and the second polyimide layer and between at least a portion of the plurality of metal structures, the optically conductive adhesive having a first index of refraction.

19. The opto-electronic system according to claim 18, wherein the first index of refraction is at least 0.028 greater than indices of refraction of the first polyimide layer and the second polyimide layer.

20. The opto-electronic system according to claim 18, further comprising a second metallic seed layer over the optically conductive adhesive, wherein the first metallic seed layer is under the optically conductive adhesive.

* * * * *

UNITED STATES PATENT AND TRADEMARK OFFICE
CERTIFICATE OF CORRECTION

PATENT NO. : 5,659,648
DATED : August 19, 1997
INVENTOR(S) : James H. Knapp et al.

It is certified that error appears in the above-identified patent and that said Letters Patent is hereby corrected as shown below:

Column 5,
Line 34, delete "wavelength;" and add -- waveguide --.
Line 65, delete "structure" and add -- structures --.

Column 6,
Line 44, delete "10" and add -- 14 --.

Column 7,
Lines 4-9, delete "compromising a plated metal layer over a first metallic seed layer; and an optically conductive adhesive between the first polyimide layer and the second polyimide layer and between at least a portion of the plurality of metal structures"

Signed and Sealed this

Second Day of July, 2002

Attest:

JAMES E. ROGAN
Attesting Officer      Director of the United States Patent and Trademark Office